United States Patent [19]

Turner et al.

[11] Patent Number: 4,905,950
[45] Date of Patent: Mar. 6, 1990

[54] MOUNTING ASSEMBLY

[75] Inventors: Mark L. Turner, Grand Rapids; Henry M. Anderson, Jr., Belding, both of Mich.

[73] Assignee: Convenience Marine Products, Inc., Grand Rapids, Mich.

[21] Appl. No.: 210,860

[22] Filed: Jun. 24, 1988

[51] Int. Cl.$^4$ .............................................. A62C 39/00
[52] U.S. Cl. .................................... 248/313; 24/273; 24/69 SK; 248/229
[58] Field of Search .................... 248/313, 312, 312.1, 248/316.1, 229, 103; 24/273, 270, 68 SK, 69 SK, 71 SK, 546, 545, 563

[56] References Cited

U.S. PATENT DOCUMENTS

| | | | |
|---|---|---|---|
| 991,192 | 5/1911 | Battenfeld | 24/270 |
| 1,088,530 | 2/1914 | Buse | 24/273 |
| 1,294,854 | 2/1919 | Welter . | |
| 2,029,707 | 2/1936 | Dodelin . | |
| 2,915,799 | 12/1959 | Andreasen . | |
| 2,919,017 | 12/1959 | Weber . | |
| 2,985,349 | 5/1961 | McGuire | 248/229 X |
| 3,204,775 | 9/1965 | Smith et al. | 248/313 X |
| 3,227,411 | 1/1966 | Treutler . | |
| 3,336,643 | 8/1967 | Robison . | |
| 3,429,542 | 2/1969 | Fagan | 248/313 |
| 4,005,844 | 2/1977 | Richmond . | |
| 4,049,164 | 9/1977 | Sullivan et al. . | |
| 4,213,592 | 7/1980 | Lingenfalser | 248/313 |
| 4,304,383 | 12/1981 | Huston | 248/313 |
| 4,341,267 | 7/1982 | Lagasse . | |
| 4,505,448 | 3/1985 | Massie . | |

OTHER PUBLICATIONS

Photographs of four (4) prior art devices.

Primary Examiner—Ramon S. Britts
Assistant Examiner—Karen J. Chotkowski
Attorney, Agent, or Firm—Price, Heneveld, Cooper, De Witt & Litton

[57] ABSTRACT

A mounting assembly for fire extinguishers which includes a bracket shaped to define a substantially V-shaped trough. A flexible strap is adapted to be wrapped tautly about the fire extinguisher and thereby hold it tightly in the bracket's trough. The strap includes a bail which cooperates with a pivotally mounted latch member for locking the strap against the extinguisher. The strap also includes an aperture which is adapted to be interlockingly attached to a hook structure provided on the bracket. This arrangement permits the strap to be quickly and easily removed from or attached to the bracket without the use of tools. Due to the bracket's substantially two-point engagement with the extinguisher, and the easy release and attachment of the flexible strap, the mounting assembly may be easily adapted to hold fire extinguishers of various sizes by the easily performed exchange of the flexible strap. Furthermore, a pair of tracks are provided to receive and support the bail, when locked to the latch member, to resist deformation and premature failure of the bail. Also, a bottom support having an abutment flange for supporting the bottom of the extinguisher is designed to be mounted wihtin a channel provided in the bottom bracket of the mounting assembly. The channel and bottom support are constructed so that the bottom support may be mounted therein regardless of which side of the extinguisher the projecting leg of the bracket extends.

24 Claims, 2 Drawing Sheets

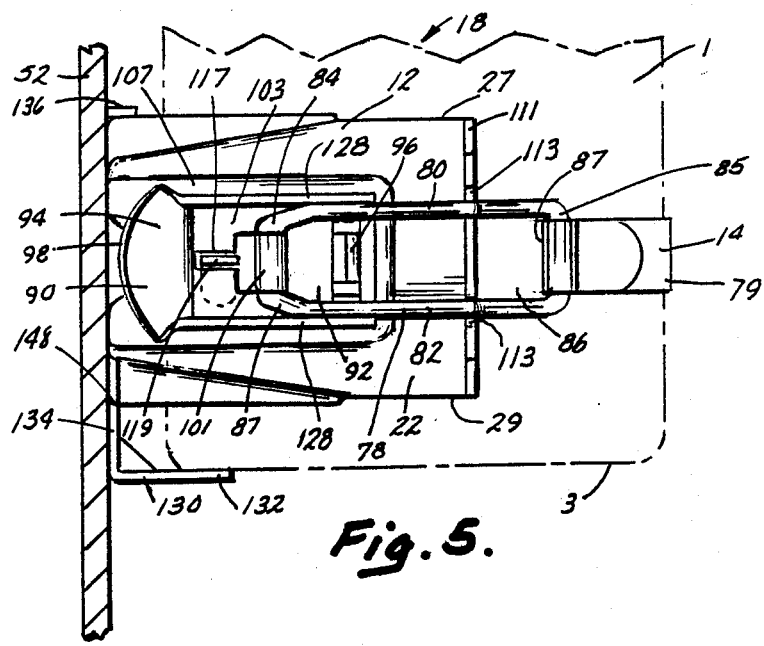
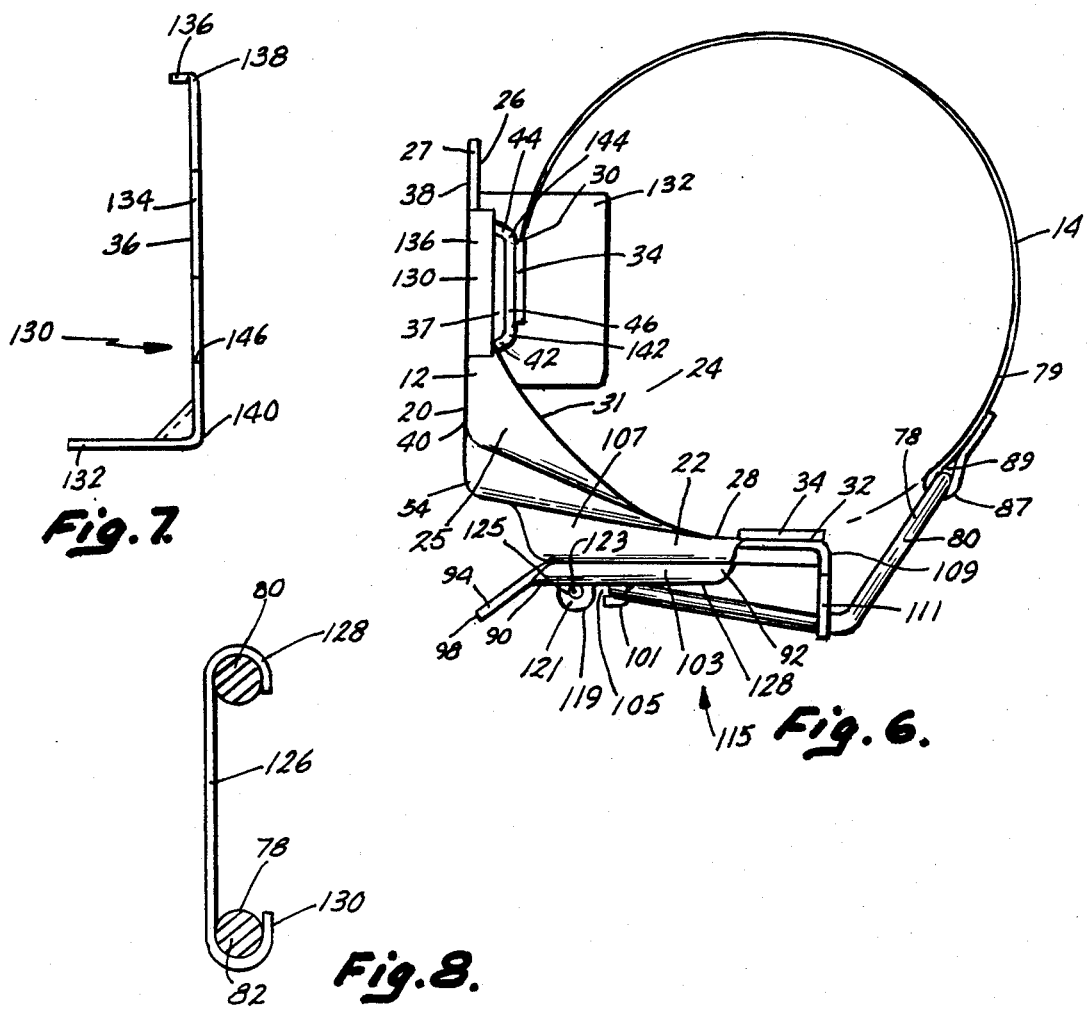

MOUNTING ASSEMBLY

BACKGROUND OF THE INVENTION

The present invention pertains to a mounting assembly for securely holding and supporting fire extinguishers. The assembly is particularly suited for use in boats, aircraft, trains, vehicles and the like wherein the mounted extinguisher is subjected to a wide range of external forces.

Fire extinguishers have been required or recommended for use in various modes of transportation such as boats, trains, aircraft, vehicles and the like for a number of years. The mounting of such extinguishers involves a myriad of concerns, such as: requiring only a minimum amount of space since it is often a premium in these environments; and having a strong, durable assembly which can securely hold the extinguisher against the external forces which inevitably are applied when the boat, aircraft, etc., moves. The external forces may be quite large and in the form of impact forces due to the uneven movements experienced in most modes of transportation.

Many prior art mounting assemblies for fire extinguishers are of a bulky or weak design and therefore undesirable for use in most modes of transportation. While mounting assemblies which are suitable for use in transportation mediums do exist, they have heretofore been specially designed to match a particular size of fire extinguisher. This results in a greatly increased number of mounting assemblies which must be designed and fabricated, which, in turn, increases manufacturing and purchasing costs. Moreover, with the use of past mounting assemblies having the needed strength and durability, a user is limited to essentially the same size extinguisher when making a replacement unless he installs a different mounting assembly.

SUMMARY OF THE INVENTION

The aforementioned problems are overcome in the present invention, wherein a strong, compact mounting assembly is provided, in which a variety of types and sizes of fire extinguishers may be securely held upon the easy performance of a minor modification.

The mounting assembly includes at least one bracket having inner surfaces adapted to engage spaced apart portions of a fire extinguisher, and a flexible strap adapted to releasably attach to the bracket and wrap around the periphery of the extinguisher to securely hold it against the inner surfaces of the bracket. The bracket configuration—which in its preferred form defines an essentially V-shaped trough—effects a substantially two-point engagement of the fire extinguisher so that a variety of fire extinguishers of many different sizes may be received and securely held within the defined trough. The releasable coupling construction enables the strap to be easily removed from or attached to the bracket through positive action and without the use of tools.

Consequently, a user need only change the flexible strap, which is easily removed or attached, and inexpensive to purchase, to accommodate the retention of a different sized extinguisher. This characteristic gives the mounting assembly of the present invention a universal appeal by which many types and sizes of fire extinguishers may be held.

In a second aspect of the invention, the bracket is formed such that a bottom support member for the fire extinguisher may be interlockingly secured therewith to facilitate the availability of alternate mounting arrangements for the mounting assembly. The portion of the bracket designed to cooperate with the bottom support is symmetrical to the extent that the extending portion of the bracket may be positioned on either side of the fire extinguisher and still readily receive and mount the bottom support. Hence, the universal appeal of the mounting assembly is further enhanced, since it may be specially adapted to fit the particular environment in which it is to be mounted.

In a third aspect of the invention, the mounting bracket is provided with tracks which guide and support a bail segment of the strap when coupled with a latch mechanism so that the bail does not prematurely lose its original shape and be thereby weakened. This is particularly important when the mounting assembly is subject to substantial impact forces.

These and other objects, advantages and features of the present invention will be more fully understood and appreciated by reference to the written specification and appended drawings.

BRIEF DESCRIPTION OF THE DRAWINGS

FIG. 5 is a side elevational view of the bottom set of the mounting assembly;

FIG. 6 is a top view thereof;

FIG. 7 is a side elevational view of the bottom support of the present invention; and FIG. 8 is an enlarged cross-sectional view taken along line VIII—VIII in FIG. 1.

DETAILED DESCRIPTION OF THE PREFERRED EMBODIMENT

Figure 1:
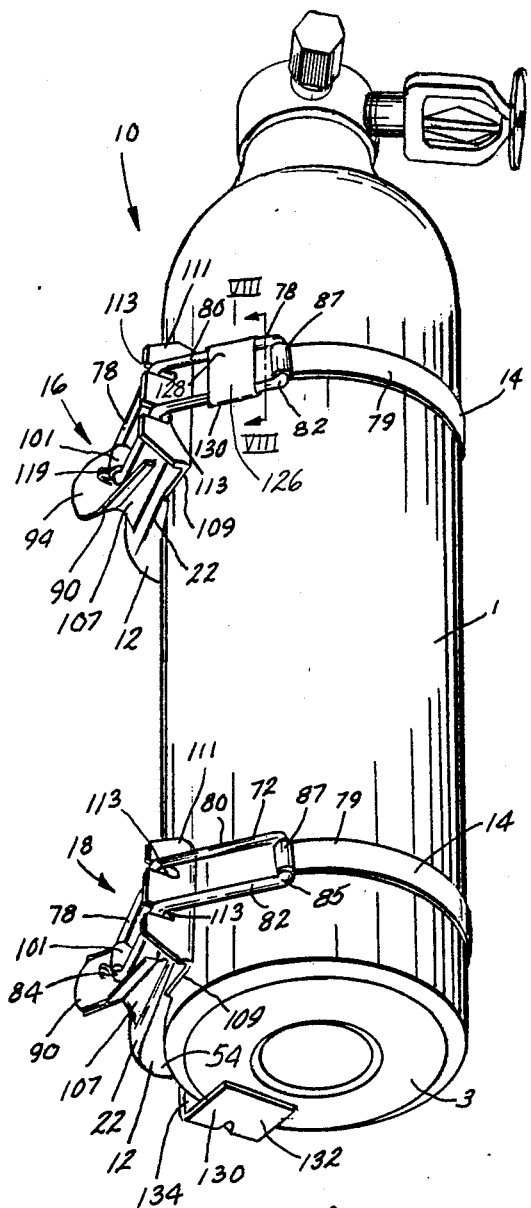
FIG. 1 shows a perspective view of the mounting assembly of the present invention holding a fire extinguisher.

In the preferred embodiment, a mounting assembly 10 for securely holding and supporting a fire extinguisher 1, includes brackets 12 and flexible elements or straps 14 (FIG. 1). Preferably, mounting assembly 10 includes a pair of brackets 12 and straps 14 such that one set 16 of brackets and straps secures the upper end of extinguisher 1, and the other set 18 secures the lower end thereof.

Each bracket 12 includes a pair of legs 20, 22 which are interconnected at one end to form a substantially V-shaped configuration (FIG. 6). A V-shaped trough 24 is thereby defined to receive and hold extinguisher 1 therein. Since extinguishers 1 are cylindrical in shape, V-shaped trough 24 essentially forms a two-point engagement therewith. The two-point engagement facilitates the receipt and secure mounting of a wide range of fire extinguisher sizes. Further, brace flanges 25 are provided along the upper and lower edges 27, 29 (FIG. 5) of bracket legs 20, 22 to enhance the strength and durability of bracket 12 (FIGS. 5 and 6). Brace flanges 25 are dimensioned with a broad inner arcuate edge 31 to obviate any disruption of the desired two-point engagement with extinguisher 1 (FIG. 6).

Each leg 20, 22 includes an inner surface 26, 28 along which is provided a portion 30, 32 designed to engage extinguisher 1. In order to avoid marring or damaging of extinguisher 1 and to absorb some of the shock of the impact forces to which it is subjected, an elastomeric panel 34 is provided along each engagement portion 30, 32 of inner surfaces 26, 28. Preferably, panels 34 are composed of polyurethane and secured in position by an acrylic pressure sensitive adhesive, but of course could be composed and secured by other materials possessing the requisite characteristics.

Figure 4:
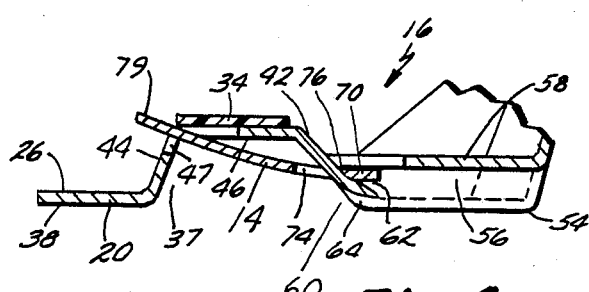
FIG. 4 is a fragmented cross-sectional view taken along line IV—IV in FIG. 3 (with the bottom support deleted for clarity)

First leg 20 of bracket 12 is fabricated with a contoured shape. More specifically, the central portion 36 is recessed from the end portions 38, 40 to form a channel 37 having inner and outer arms 42, 44 and a bight 46 (FIGS. 4 and 6). Bight 46 defines engagement portion 30 to which an elastomeric panel 34 is attached. Passing through bight 46 and outer arm 44 is a slot 47, through which is received strap 14 to facilitate interconnection with bracket 12 as will be discussed below.

Figure 2:
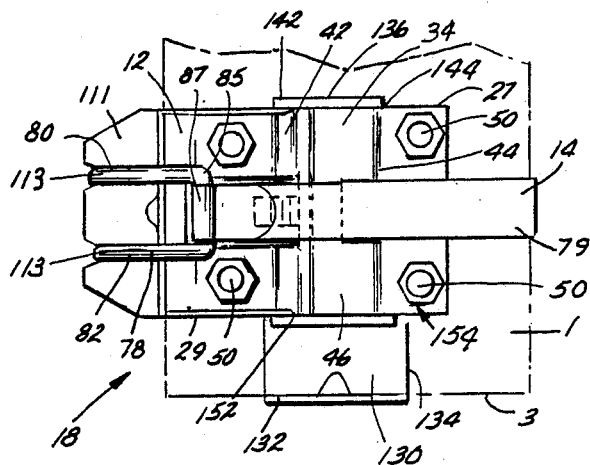
FIG. 2 is a front elevational view of the bottom set of the mounting assembly.
Figure 3:
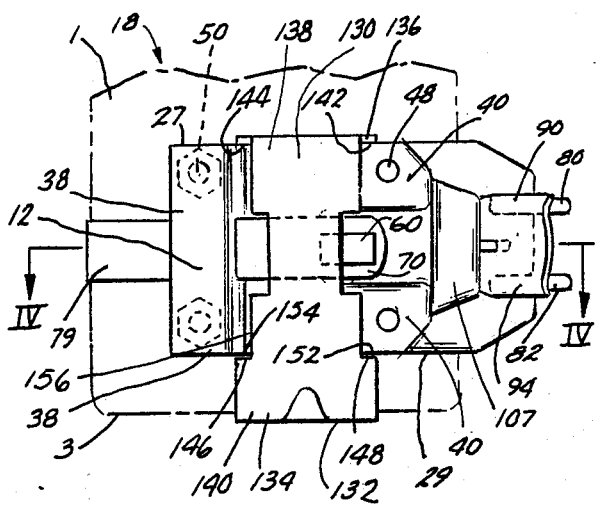
FIG. 3 is a rear elevational view thereof.

End portions 38, 40 of first leg 20 are provided with a plurality of spaced apart holes 48 through which screws 50 or other fastening members are passed to mount bracket 12 securely to a wall 52 or the like (FIGS. 2 and 3). Preferably, four holes 48 are provided such that one is provided in each quadrant of first leg 20. End portion 40 is further provided with a medial, shallow recess 56 which extends from an intermediate point on inner arm 42 to a point near apex 54.

Recess 56 is positioned in substantial alignment with slot 47. At the juncture of base surface 58 of recess 56 and inner arm 42 is provided with an outwardly extending hook structure 60 (FIGS. 3 and 4). Hook structure 60 comprises a generally L-shaped flange which is preferably formed by displacing a portion of base surface 58 into a substantially L-shaped configuration. Hook 60 defines a gap which is oriented such that it opens generally in the direction of apex 54. Further, hook 60 extends outwardly from surface 58 a distance less than the depth of recess 56, so that a space 64 is defined between wall 52 to which bracket 12 is attached, and hook 60.

Strap 14 comprises an elongated flexible band 79 and bail 80 which is used to wrap around the periphery of extinguisher 1 and tightly hold it in trough 24 of bracket 12 (FIGS. 1-6). Strap 14 includes first and second opposite ends 70, 72 which in use are operably attached to first and second legs 20, 22, respectively, of bracket 12.

First end 70 includes an elongated opening 74 which defines a transversely extending engagement edge 76. Engagement edge 76 attaches strap 14 to first leg 20 of bracket 12 by being received within gap 62 and thereby interlocking with hook 60 (FIG. 4). More specifically, when strap 14 is to be attached to first leg 20 of bracket 12, first end 70 is fed through slot 47 so as to be positioned within channel 37, between bight 46 and wall 52. Strap 14 is then moved further axially such that first end 70 is passed into recess 56, and through space 64, until opening 74 is aligned with hook 60. At this point, strap 14 is deformed by the user to enable shifting of the first end 70 toward base surface 58 so that hook 60 is passed through opening 74. Now with engagement edge 76 aligned with gap 62, a simple pulling of strap 14 by the user interlockingly abuts first end 70 of strap 14 with hook 60 of bracket 12. The tensile forces then applied through strap 14 in the securing of a fire extinguisher 1, tightly locks first end 70 to bracket 12 and precludes an inadvertent release thereof. Furthermore, due to the sequence of different movements, the closeness of the spacings and the deformation of strap 14, first end 70 is also precluded from inadvertently detaching even when second end 72 is uncoupled for removal of extinguisher 1 for weighing, use, replacement or the like. Nevertheless, intentional removal of strap 14 therefrom, may be easily accomplished by reversing the above noted steps given for the strap's attachment.

Second end 72 of strap 14 includes a bail 78, attached to the end of band 79, which is preferably in the form of a looped wire having a pair of parallel longitudinal portions 80, 82 and a distal, interconnecting transverse portion 84 (FIGS. 1, 5 and 6). Preferably, bail 78 also includes a mounting transverse portion 85 to facilitate attachment thereof to band 79. More specifically, end 87 of band 79 is bent back upon itself and welded together to thereby form a hole 89 through which is received mounting portion 85. The portions of the loop 80, 82, 84, and end 87 of band 79 collectively define therebetween an aperture 86. Each of the longitudinal portions 80, 82 are bent into a substantially V-shape to facilitate the overcenter latching arrangement utilized to secure strap 14 to second leg 22 of bracket 12 via a latch member 90.

On outer surface 88 of second leg 22 is provided a latch member 90 having opposite ends 92, 94 (FIGS. 1, 5 and 6). For rigidity and strength purposes, latch member 90 is preferably of a substantially channel-shaped configuration. Latch member 90 is pivotally coupled at one end 92 via a pivot element 96. Its opposite free end 94 is shaped with an upturned edge 98 for easy grasping by a user. A hook member 101 is fixedly attached to a medial portion 103 of latch member 90.

Hook member 101 is substantially L-shaped and preferably is formed by displacing a portion of latch member 90 into an L-shaped configuration. Hook 101 defines a gap 105 which opens in the general direction of free end 94. Gap 105 is sized and shaped to receive therein, in a holding relationship, bail 78. More specifically, when latch member 90 is positioned outwardly, for example at a right angle to outer surface 88, transverse portion 84 of bail 78 may be placed within gap 105. Once this is accomplished, the user may press free end 94 toward apex 54 until it abuts against raised platform 107 on second leg 22. This movement effects an overcenter locking arrangement that secures strap 14 tightly against the periphery of extinguisher 1, and thereby securely holds extinguisher 1 in trough 24 of bracket 12.

Positioned intermediately between hook member 101 and upturned edge 98 is preferably provided a slot 117 extending through latch member 90 (FIG. 5). Slot 117 is adapted to receive therethrough, when latch member 90 is positioned to abut platform 107, an outwardly extending projection 119 fixedly attached and extending perpendicularly from the central portion of raised platform 107 (FIGS. 5 and 6). Distal end 121 of projection 119 is provided with an aperture 123 which is preferably positioned such that its innermost edge 125 extends just beyond outer edges 128 of latch member 90. A pin or the like (not shown) is designed to be received through aperture 123, so as to preclude any pivoting action of latch member 90 about pivot pin 96. The particular locking pin structure utilized is dependent on whether the secured extinguisher is intended for automatic or manual use. Clearly, with manual use the locking pin must be of the type that is easily and quickly removed, such as a straight shaft having a pull ring. However, with extinguishers designed only for automatic use, a padlock or other secured restraining means may be used. In any event, this construction ensures that latch member 90 will not inadvertently release strap 12, and in turn extinguisher 1, through large external impact forces, bumping of the latch, etc. Also, alternatively, aperture 123 may be utilized as a convenient and accessible means for the attachment of an inspection tag.

In the locked position, ends 70, 72 of strap 14 are attached to bracket 12 and held against movement through their locking interconnection with hook structure 60 and hook member 101, respectively. Strap 14 is of a predetermined length, depending upon the size of extinguisher 1 to be secured, such that it is wrapped tautly about the periphery of extinguisher 1. The tensile forces which are thereby developed effectively obviate the risk of strap 14 being inadvertently released from hooks 60, 101. Yet, latch member 90 permits easy release of second end 72 and removal of extinguisher 1 from assembly 10; and opening 74 permits easy removal of strap 14 from bracket 12 to facilitate an easy exchange thereof to a strap of a different size.

At distal end 109 of second leg 22 is provided an outwardly extending flange 111 (FIGS. 1, 5 and 6). Flange 111 is provided with a pair of parallel tracks 113 which are formed as outwardly opening slots cut into flange 111. Tracks 113 are aligned with longitudinal portions 80, 82 of bail 78, such that as latch member 90 is moved toward its locked position, bail 78 is received into tracks 113. After prolonged use, the combination of the tensile forces and the various external forces, in particular the impact forces, applied against strap 14 tend to deform and weaken bail 78. The addition of flange 111 having tracks 113 maintains the shape and strength of bail 78, and gives the latch mechanism 115 a long lasting durability not otherwise achievable.

In the use of large brackets specially suited to support very large extinguishers, the use of tracks 113 alone are not sufficient to prevent the unwanted deformation of bail 78. In these instances, a supplementary clip 126 is provided to be placed over the parallel longitudinal portions 80, 82 between flange 111 and band 79 (FIG. 1—illustrated in conjunction with upper set 16 only). Clip 126 is preferably formed as a unitary plate having opposite hook-shaped sides 128, 130 adapted to matingly receive bail portions 80, 82, respectively, and thereby resist any outward deformation thereof (FIGS. 1 and 8).

A bottom support 130, configured to interlock with bracket 12 of bottom set 18, provides an extending abutment flange 132 which is adapted to engage and support the bottom surface 3 of fire extinguisher 1 (FIGS. 1 and 2-7). Bottom support 130 is of a substantially C-shaped configuration, which in addition to abutment flange 132, includes a central plate 134 and a mounting flange 136 (FIG. 7). Central plate 134 includes a pair of opposing ends 138, 140 from which mounting flange 136 and abutment flange 132 project, respectively, at substantially right angles therefrom. In use, central plate 134 is positioned within channel 37 in substantially the same plane as end portions 38, 40 of first leg 20.

Mounting flange 136 projects outwardly from end 138 of central plate 134 in the same general direction as abutment flange 132 (i.e. toward extinguisher 1), but at a much shorter distance from central plate 134 than abutment flange 132. Furthermore, mounting flange 136 extends laterally outward from central plate 134, so that it overlies and is supported by inner and outer arms 42, 44 along the upper edges thereof 142, 144.

Central plate 134, near second end 140 thereof, defines a pair of laterally extending shoulders 146, 148 (FIG. 3). Shoulders 146, 148 are spaced from mounting flange 136 a distance slightly greater than the depth dimension of bracket 12, such that they are adapted to underlie lower edges 152, 154 of inner and outer arms 42, 44. Furthermore, the reduced portion 156 of central plate 134 positioned within channel 37 has a width slightly less than the distance between end portions 38, 40. In this way, central plate 134 is precluded from moving laterally by end portions 38, 40 and outwardly by inner and outer arms 42, 44 (due to their inclined orientation).

Channel 37 and central plate 134 are formed such that central plate 134 of bottom support 130 may be received therein, even if bracket 12 is inverted. In such an arrangement, mounting flange 136 would overlie and abut lower edges 152, 154 of inner and outer arms 42, 44 and shoulders 146, 148 would underlie the upper edges 142, 144 thereof. This feature enables bracket 12 to be oriented with the second leg 22 extending along one side of extinguisher 1 (as seen in FIG. 6) or the opposite side (not shown). Consequently, this variety of mounting increases the versatility of mounting assembly 10, by permitting it to be more easily fit into the desired environment.

Of course, it is understood that the above descriptions are those of preferred embodiments of the invention. Various other embodiments, as well as many changes and alterations, may be made without departing from the spirit and broader aspects of the invention as defined in the claims.

The embodiments of the invention in which an exclusive property or privilege is claimed are defined as follows.

1. A mounting assembly for securely, but releasably, holding and supporting a fire extinguisher or the like, wherein said assembly comprises:
   a pair of brackets, each bracket having means for defining a trough shaped to receive and support therein the extinguisher;
   a pair of flexible elements, each flexible element adapted to be tautly wrapped about the periphery of the extinguisher;
   a pair of first locking means, each of said first locking means operatively joined to one of said flexible elements and one of said brackets for releasably locking one portion of said one of said flexible elements to one of said brackets;
   a pair of second locking means, each of said second locking means operatively joined to one of said flexible elements and one of said brackets for releasably locking another portion of one of said flexible elements, spaced from said one portion, to one of said brackets;
   said first and second locking means each being operable to tightly hold the extinguisher in said troughs by said flexible elements, and to easily and quickly release said flexible elements from said brackets without the use of tools, so that flexible elements of a different size may be easily interchanged therewith and attached to said brackets to accommodate a different sized extinguisher; and
   a bottom support member engaging one of said brackets for engaging and supporting a bottom of an extinguisher.

2. The mounting assembly of claim 1 in which said bracket includes a pair of legs which are interconnected to define said trough in a shape such that the extinguisher is supported therein in a substantially two-point engagement.

3. The mounting assembly of claim 2 wherein said bottom support member has a central plate and an abutment flange projecting outwardly therefrom, said flange being adapted to engage and support the bottom of the extinguisher, and wherein said one leg of said bracket includes a channel-shaped portion, said central plate of said bottom support member being received and mounted within said channel-shaped portion.

4. The mounting assembly of claim 3 in which said bottom support member and said channel-shaped portion are formed such that said central plate can be mounted within said channel-shaped portion in either a first orientation of said bracket in which the other of said legs of said bracket extends along one side of the extinguisher or alternatively a second orientation of aid bracket, which is inverted to said first orientation, in which said other leg of said bracket extends along a side of said extinguisher opposite said one side thereof.

5. The mounting assembly of claim 2 further including a pair of elastomeric panels affixed to each of said brackets at said two engagement points to thereby alleviate the risk of marring or damaging the extinguisher.

6. The mounting assembly of claim 1 in which each of said first locking means includes a hook structure fixedly attached to one of said brackets and an aperture provided in said one portion of one of said flexible elements, said aperture being dimensioned to receive said hook structure therethrough and defining a distal engagement edge which is adapted to interlockingly engage said hook structure, whereby said flexible element is releasably secured to said bracket.

7. A mounting assembly for securely, but releasably, holding and supporting a fire extinguisher or the like, wherein said assembly comprises:
 at least one bracket having means for defining a trough shaped to receive and support therein the extinguisher;
 at least one flexible element adapted to be tautly wrapped about the periphery of the extinguisher;
 a first set of locking means for releasably locking one portion of said flexible element to said bracket; and
 a second set of locking means for releasably locking another portion of said flexible element, spaced from said one portion, to said bracket;
 said first and second sets of locking means being operable to tightly hold the extinguisher in said trough by said flexible element, and to easily and quickly release said flexible element from said bracket without the use of tools, so that a flexible element of a different size may be easily interchanged therewith and attached to said bracket to accommodate a different sized extinguisher, said first set of locking means including a hook structure fixedly attached to said bracket and an aperture provided in said one portion of said flexible element, said aperture being dimensioned to receive said hook structure therethrough and defining a distal engagement edge which is adapted to interlockingly engage said hook structure, whereby said flexible element is releasably secured to said bracket, said bracket including a channel-shaped portion which extends into said trough and is adapted to engage said extinguisher, said channel-shaped portion including a slot which is adapted to receive said flexible element therethrough when said flexible element is attached to said hook structure.

8. The mounting assembly of claim 7 in which said bracket further includes a recess in which is mounted said hook structure, said hook structure extends outwardly a distance less than the depth of said recess so that a gap is defined beyond said hook structure through which is passed said flexible element when releasing from or attaching to said hook structure.

9. The mounting assembly of claim 6 in which each of said second locking means includes a latch member having a second hook structure which is pivotally mounted to one of said brackets for movement between an open position and a closed position, and a bail having a pair of parallel longitudinal portions and a transverse portion, attached to said other portion of each of said flexible elements, wherein said bail is adapted to be received within said second hook structure and interlockingly secured thereto when said latch member is closed.

10. A mounting assembly for securely, but releasably, holding and supporting a fire extinguisher or the like, wherein said assembly comprises:
 at least one bracket having means for defining a trough shaped to receive and support therein the extinguisher;
 at least one flexible element adapted to be tautly wrapped about the periphery of the extinguisher;
 a first set of locking means for releasably locking one portion of said flexible element to said bracket; and
 a second set of locking means for releasably locking another portion of said flexible element, spaced from said one portion, to said bracket;
 said first and second sets of locking means being operable to tightly hold the extinguisher in said trough by said flexible element, and to easily and quickly release said flexible element from said bracket without the use of tools, so that a flexible element of a different size may be easily interchanged therewith and attached to said bracket to accommodate a different sized extinguisher;
 said first set of locking means including a hook structure fixedly attached to said bracket and an aperture provided in said one portion of said flexible element, said aperture being dimensioned to receive said hook structure therethrough and defining a distal engagement edge which is adapted to interlockingly engage said hook structure, whereby said flexible element is releasably secured to said bracket;
 said second set of locking means including a latch member having a second hook structure which is pivotally mounted to said bracket for movement between an open and closed position, and a bail having a pair of parallel longitudinal portions and a transverse portion, attached to said other portion of said flexible element, wherein said bail is adapted to be received within said second hook structure and interlockingly secured thereto when said latch member is closed; and wherein said assembly further includes means for defining a pair of tracks mounted to said bracket, which are adapted to receive therein said longitudinal portions of said bail when said latch member is closed to thereby resist deformation of said bail and premature failure thereof when it is subjected to various external forces.

11. The mounting assembly of claim 10 in which said track defining means includes a flange projecting outwardly from said bracket, and in which said tracks are a pair of spaced apart, outwardly opening slots dimensioned to matingly receive said longitudinal portions therein when said latch member is closed.

12. The mounting assembly of claim 10 further including a clip received over and engaged with said longitudinal portions of said bail to further resist outward deformation of said bail and premature failure thereof.

13. A mounting assembly for securely, but releasably, holding and supporting a fire extinguisher or the like, wherein said assembly comprises:
   at least one bracket having means for defining a trough shaped to receive and support therein the extinguisher;
   at least one flexible element adapted to be tautly wrapped about the periphery of the extinguisher;
   a first set of locking means for releasably locking one portion of said flexible element to said bracket; and
   a second set of locking means for releasably locking another portion of said flexible element, spaced from said one portion, to said bracket;
   said first and second sets of locking means being operable to tightly hold the extinguisher in said trough by said flexible element, and to easily and quickly release said flexible element from said bracket without the use of tools, so that a flexible element of a different size may be easily interchanged therewith and attached to said bracket to accommodate a different sized extinguisher;
   said first set of locking means including a hook structure fixedly attached to said bracket and an aperture provided in said one portion of said flexible element, said aperture being dimensioned to receive said hook structure therethrough and defining a distal engagement edge which is adapted to interlockingly engage said hook structure, whereby said flexible element is releasably secured to said bracket,
   said second set of locking means including a latch member having a second hook structure which is pivotally mounted to said bracket for movement between an open and closed position, and a bail having a pair of parallel longitudinal portions and a transverse portion, attached to said other portion of said flexible element, wherein said bail is adapted to be received within said second hook structure and interlockingly secured thereto when said latch member is closed;
   said assembly further including a slip received over and engaged with said longitudinal portions of said bail to resist deformation of said bail and premature failure thereof when it is subjected to various external forces.

14. The mounting assembly of claim 13 which further includes a securing element fixedly attached to and projecting from said bracket and having a hole through a distal end thereof, and in which said latch member further includes an opening through which said securing element is passed when said latch member is in said closed position, wherein said hole in said securing element is adapted to receive therethrough a means for precluding movement of said latch member away from said closed position, whereby the risk of said latch opening inadvertently is obviated.

15. The mounting assembly of claim 7 further including a bottom support member having a central plate and an abutment flange projecting outwardly therefrom adapted to engage and support the bottom of the extinguisher, and wherein said bracket includes a channel-shaped portion, said central plate of said bottom support member being received and mounted within said channel-shaped portion.

16. The mounting assembly of claim 15 in which said bottom support member includes a mounting flange and a pair of shoulders spaced therefrom, wherein said mounting flange overlies one edge of said bracket and said shoulders overlie an opposite edge of said bracket to thereby mount said bottom support within said channel-shaped portion.

17. A mounting assembly for securely, but releasably, holding and supporting a fire extinguisher or the like, wherein said assembly comprises:
   at least one bracket having a pair of legs which are interconnected to define a trough which is adapted to receive therein the extinguisher in a substantially two-point engagement;
   at least one flexible strap having first and second opposite ends, wherein said first end is provided with means for defining a first aperture and said second end is provided with means for defining a second aperture;
   means for defining a first hook structure fixedly attached to one of said legs; and
   a latch member movably mounted upon the other of said legs for movement between an open and closed position, said latch member including means for defining a second hook structure;
   wherein said first aperture defining means is adapted to interlock and be secured with said first hook structure, and said second aperture is adapted to interlock and be secured with said second hook structure, whereby said strap is tautly wrapped around the periphery of the extinguisher when said apertures and hooks are so interlocked and said latch mechanism is closed, and whereby said strap can be easily removed from said bracket and exchanged with a strap of a different size to accommodate a fire extinguisher of a different size, and wherein said one leg of said bracket includes a channel-shaped portion which extends into said trough and is adapted to engage said extinguisher, said channel-shaped portion includes a slot which is adapted to receive said strap therethrough when said strap is attached to said first hook structure.

18. The mounting assembly of claim 17 in which said one leg further includes a recess in which is mounted said first hook structure, said first hook structure extends outwardly a distance less than the depth of said recess so that a gap is defined beyond said first hook structure through which is passed said flexible element when releasing from or attaching to said first hook structure.

19. The mounting assembly of claim 18 further including means for defining a pair of tracks mounted to said other leg of said bracket, and wherein said means for defining said second aperture includes a bail having a pair of parallel longitudinal portions and a transverse portion, said tracks being adapted to receive therein said longitudinal portions of said bail when said latch member is closed to thereby resist deformation of said bail and premature failure thereof when it is subjected to various external forces.

20. The mounting assembly of claim 19 in which said track defining means includes a flange projecting outwardly from said other leg of said bracket, and in which said tracks are a pair of spaced apart, outwardly opening slots dimensioned to matingly receive said longitudinal portions therein when said latch member is closed.

21. The mounting assembly of claim 20 further including a bottom support member having a central plate which is received and mounted within said channel-shaped portion, and an abutment flange projecting outwardly therefrom which is adapted to engage and support the bottom of the extinguisher;

said bottom support member and said channel-shaped portion are formed such that said central plate can be mounted within said channel-shaped portion in either a first orientation of said bracket in which the other of said legs of said bracket extends along one side of the extinguisher or alternatively a second orientation of said bracket, which is inverted to said first orientation, in which said other leg of said bracket extends along a side of the extinguisher opposite said one side thereof.

22. A mounting assembly for securely holding and supporting a fire extinguisher or the like, wherein said assembly comprises:

a bracket having means for defining a trough which is adapted to receive therein the extinguisher;

a latch member pivotally mounted to said bracket for movement between an open and closed position and provided with an outwardly extending hook structure;

a flexible element including a bail having a pair of parallel longitudinal portions and a transverse portion, said bail is adapted to be releasably interlocked with said hook structure so that said flexible element can be secured to said bracket when said latch member is moved to said closed position, whereby said flexible element is wrapped tautly about the periphery of the extinguisher to securely hold said extinguisher in said trough; and means for defining a pair of tracks mounted to said bracket, which are adapted to receive therein said longitudinal portions of said bail when said latch member is closed to thereby resist deformation of said bail and premature failure thereof when it is subjected to various external forces.

23. The mounting assembly of claim 22 in which said track defining means includes a flange projecting outwardly from said bracket, and in which said tracks are a pair of spaced apart, outwardly opening slots dimensioned to matingly receive said longitudinal portions therein when said latch member is closed.

24. The mounting assembly of claim 22 further including a clip received over and engaged with said longitudinal portions of said bail to further resist outward deformation of said bail and premature failure thereof.

* * * * *

UNITED STATES PATENT AND TRADEMARK OFFICE
CERTIFICATE OF CORRECTION

PATENT NO. : 4,905,950

DATED : March 6, 1990

INVENTOR(S) : Mark L. Turner and Henry M. Anderson, Jr.

It is certified that error appears in the above-identified patent and that said Letters Patent is hereby corrected as shown below:

Column 7, line 18;

"aid" should be --said--.

Column 9, line 53;

"slip" should be --clip--.

Signed and Sealed this

Twentieth Day of August, 1991

*Attest:*

HARRY F. MANBECK, JR.

*Attesting Officer*  *Commissioner of Patents and Trademarks*